US006714708B2

(12) United States Patent
McAlpine et al.

(10) Patent No.: US 6,714,708 B2
(45) Date of Patent: Mar. 30, 2004

(54) FIBER OPTIC WITH HIGH STRENGTH COMPONENT

(75) Inventors: Warren W. McAlpine, Hickory, NC (US); Larry W. Field, Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 363 days.

(21) Appl. No.: 09/822,528

(22) Filed: Mar. 30, 2001

(65) Prior Publication Data
US 2003/0206705 A1 Nov. 6, 2003

(51) Int. Cl.[7] .............................................. G02B 6/44
(52) U.S. Cl. ..................................................... 385/110
(58) Field of Search .......................... 385/100, 103, 385/105, 102, 107, 108–114, 135–137, 140

(56) References Cited

U.S. PATENT DOCUMENTS

| | | |
|---|---|---|
| 3,865,466 A | 2/1975 | Slaughter |
| 4,093,342 A | 6/1978 | Foord et al. ............. 350/96.23 |
| 4,166,670 A | 9/1979 | Ramsay |
| 4,354,732 A | 10/1982 | Arnaud et al. ........... 350/96.23 |
| 4,360,395 A | 11/1982 | Suzuki |
| 4,422,889 A * | 12/1983 | Trezeguet et al. ............ 156/70 |
| 4,491,387 A | 1/1985 | Dey et al. |
| 4,504,112 A | 3/1985 | Gould et al. |
| 4,557,559 A | 12/1985 | Winter |
| 4,577,925 A | 3/1986 | Winter et al. ............. 350/96.23 |
| 4,647,151 A | 3/1987 | Grogl et al. |
| 4,671,610 A | 6/1987 | Kitayama et al. |
| 4,685,765 A | 8/1987 | Daly et al. ................ 350/96.21 |
| 4,699,461 A | 10/1987 | Taylor et al. |
| 4,775,213 A | 10/1988 | Kitayama et al. ........ 350/96.23 |
| 4,783,953 A * | 11/1988 | Akre ................................ 57/9 |
| 4,786,138 A | 11/1988 | Buckley .................. 350/96.23 |
| 4,793,686 A | 12/1988 | Saito |
| 4,822,133 A | 4/1989 | Peacock |
| 4,830,459 A | 5/1989 | Chicken et al. |
| 4,878,733 A | 11/1989 | Winter et al. |
| 4,984,869 A | 1/1991 | Roche |
| 5,050,960 A | 9/1991 | Sutehall ...................... 385/113 |
| 5,067,830 A | 11/1991 | McAlpine et al. .......... 385/114 |
| 5,082,380 A | 1/1992 | Sutehall et al. ............. 385/114 |
| 5,115,485 A | 5/1992 | Gandy ........................ 385/101 |
| 5,222,177 A | 6/1993 | Chu et al. ................... 385/105 |
| 5,495,546 A | 2/1996 | Bottoms, Jr. et al. ....... 385/100 |
| 5,668,912 A * | 9/1997 | Keller ......................... 385/100 |
| 5,761,361 A * | 6/1998 | Pfandl et al. ............... 385/100 |
| 5,825,961 A * | 10/1998 | Wilkins et al. ............. 385/135 |
| 5,982,966 A | 11/1999 | Bonicel ...................... 385/100 |
| 5,991,485 A | 11/1999 | Kertscher et al. ........... 385/100 |
| 6,137,936 A * | 10/2000 | Fitz et al. ................... 385/113 |
| 6,169,834 B1 | 1/2001 | Keller ......................... 385/101 |

OTHER PUBLICATIONS

Optical Transmission Element, publication No. WO99/53353, Publication Date: Oct. 21, 1999.

* cited by examiner

Primary Examiner—Jean F. Duverne
(74) Attorney, Agent, or Firm—Michael E. Carroll, Jr.

(57) ABSTRACT

A fiber optic cable having at least one optical fiber component disposed within at least one retention area of a support member. The support member including a metallic or dielectric material having the retention area disposed generally helically relative to a longitudinal axis of the cable. The cable also includes an interfacial layer between an outer surface of the support member and a cable jacket substantially surrounding the support member. The cable can include a cushioning zone adjacent the optical fiber component, and/or a water-blocking component between an outer surface of the support member and the cable jacket. The support member can have at least one bendable tab for at least partially covering the retention area.

37 Claims, 4 Drawing Sheets

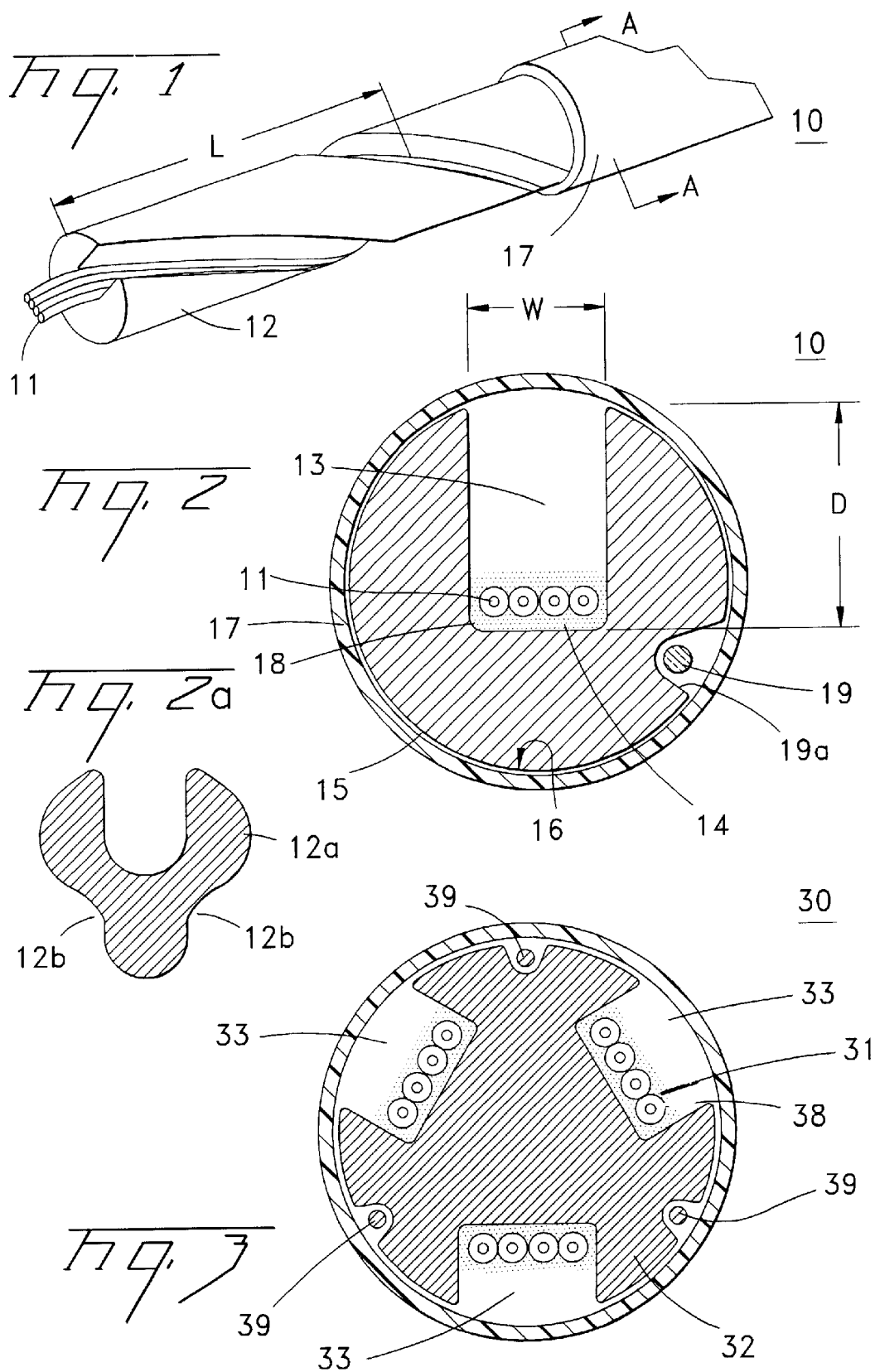

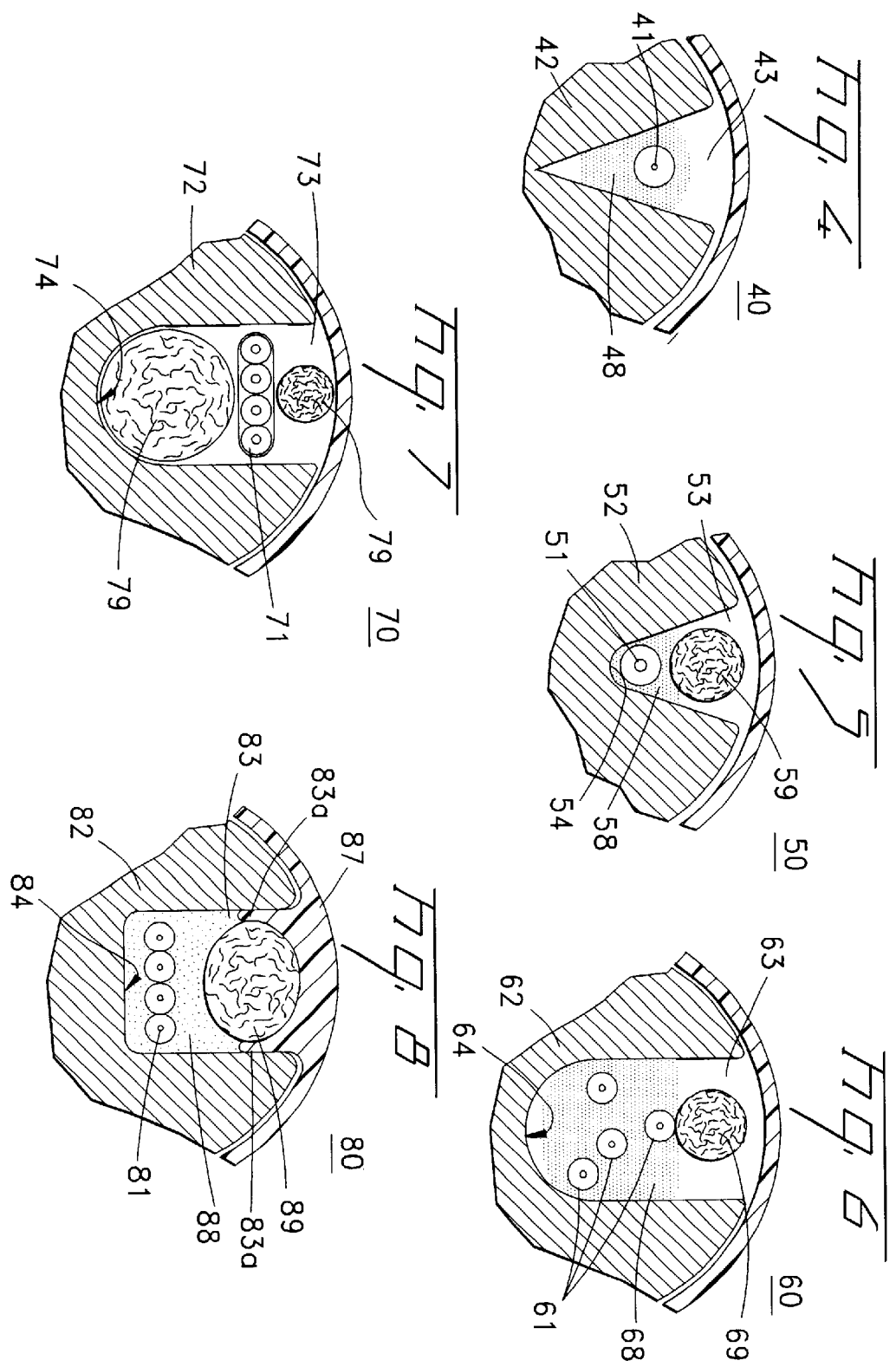

90

100

109 108

103

101

104

102

110

FIBER OPTIC WITH HIGH STRENGTH COMPONENT

FIELD OF THE INVENTION

The present invention relates generally to fiber optic cables and, more particularly, to fiber optic drop cables.

BACKGROUND OF THE INVENTION

Fiber optic cables include optical fibers that are capable of transmitting voice, video, and data signals. Fiber optic cables have advantages over electrical voice, video and data signal carriers, for example, increased data capacity. As businesses and households demand increased data capacity, fiber optic cables can eventually displace electrical voice, video, and data signal carriers. This demand will require low fiber count optical cables to be routed to end users, for example, businesses and households.

Fiber optic cables can typically be used in various applications. For example, fiber optic drop cables can be suitable for both aerial and buried cable applications. More specifically, a fiber optic drop cable can be strung between poles and/or buried in the ground before reaching the end user. Aerial and buried cable environments have unique requirements and considerations. Optical fiber drop cables should meet the unique requirements and considerations of both environments, yet still remain cost effective.

In addition to being cost effective, cables should be simple to manufacture. An example of a low fiber count optical cable manufactured in one step and having an optical fibers disposed longitudinally to the cable axis is disclosed in U.S. Pat. No. 5,115,485. An optical fiber is disposed within an electrically conductive strength member that is surrounded and embedded in an elastomeric material that forms the outer jacket. The cable also includes optical fibers embedded in the elastomeric material that forms the outer jacket. This known fiber optic cable has several disadvantages. For example, because the optical fiber is surrounded by the electrically conductive strength member, it is difficult to access the fiber. Moreover, accessing the central optical fiber can result in damage to the embedded optical fibers. Additionally, the embedded optical fibers are coupled to the elastomeric material that forms the outer jacket. Consequently, when the elastomeric outer jacket is stressed, for example, during bending, tensile and compressive stresses can be transferred to the optical fibers, thereby degrading optical performance.

Moreover, fiber optic cables that are strung between poles can carry a tensile load. An example of a fiber optic cable designed to carry a tensile load is disclosed in U.S. Pat. No. 4,422,889. This known cable is an optical fiber cable with a generally cylindrical central support member having helical grooves formed around its periphery for carrying optical fibers. During manufacture, the grooves require partial filling with a viscous filling compound, placing the optical fiber in the partially filled groove, and then filling the partially filled groove with the optical fiber with further viscous filling compound. Although this known fiber optic cable is designed to prevent the application of tensile stress to the optical fibers by allowing the fibers to sink deeper into the grooves when axially loaded, this design has several disadvantages. For example, from a manufacturing standpoint, this cable requires multiple steps at different temperatures for proper placement of optical fibers.

Optical fibers can also be twisted as they are laid in cables. An example of a fiber optic cable designed to reduce contact between a twisted optical fiber and a strength member is disclosed in U.S. Pat. No. 4,354,732. This known cable is an optical fiber cable with a helical flanked V-shaped groove. The helical flanked V-shaped groove requires a pair of flanks, over a portion of profile, which are curved convexly toward the interior of the groove. Additionally, the flanked V-groove is designed to work in concert with an optical fiber that is twisted between 3 and 10 turns per meter when inserted into the flanked groove. The fiber, which is undulated from the twisting process, is designed to rest on alternate flanked sides of the V-shaped groove and prevents an uninterrupted line of contact between the optical fiber and the strength member. Although this known fiber optic cable is designed to prevent mechanical stresses on the optical fiber, this design has several disadvantages. For example, from a manufacturing standpoint, twisting the optical fiber adds another step to the process. Additionally, twisting introduces stresses on the optical fiber that can cause undesirable levels of optical attenuation.

ASPECTS OF THE INVENTION

One aspect of the present invention provides a fiber optic cable having at least one optical fiber component disposed within at least one retention area of a support member. The support member includes a metallic material having the retention area generally helically formed therein relative to an axis of the cable. The cable also includes an interfacial layer disposed between an outer surface of the support member and the cable jacket. The cable can include a water-blocking component, a cushioning zone adjacent the optical fiber component and/or at least one tab, extending from the support member, bendable for at least partially covering the retention area.

A second aspect of the present invention provides a fiber optic cable having at least one optical fiber component disposed within at least one retention area of a dielectric or metallic support member. The support member includes a retention area disposed substantially helically about an axis of the cable. The cable includes a cushioning zone adjacent the optical fiber component and both an interfacial layer and a water-blocking component disposed between an outer surface of the support member and the cable jacket. The cable can include at least one tab, extending from the support member, bendable for at least partially covering the retention area.

A third aspect of the present invention provides a fiber optic cable having at least one optical fiber component disposed within at least one retention area of a support member. The retention area is generally helically formed therein relative to an axis of the cable. The cable having a strain of about 1.0% or less when a 1,000 lb. tensile force is applied. The cable can include a cable jacket, cushioning zone adjacent the optical fiber component, a water-blocking component, and/or at least one tab, extending from the support member, bendable for at least partially covering the retention area.

BRIEF DESCRIPTION OF THE DRAWINGS

FIG. 1 is an isometric view of a fiber optic cable in accordance with an embodiment of the present invention.

FIG. 2 is a cross sectional view of the embodiment of FIG. 1 taken along line A—A.

FIG. 2a is a cross sectional view of a support member in accordance with an embodiment of the present invention.

FIG. 3 is a cross-sectional view of a fiber optic cable in accordance with another embodiment of the present invention.

FIG. 4 is a partial cross-sectional view of a fiber optic cable in accordance with an embodiment of the present invention.

FIG. 5 is a partial cross-sectional view of a fiber optic cable in accordance with an embodiment of the present invention.

FIG. 6 is a partial cross-sectional view of a fiber optic cable in accordance with an embodiment of the present invention.

FIG. 7 is a partial cross-sectional view of a fiber optic cable in accordance with an embodiment of the present invention.

FIG. 8 is a partial cross-sectional view of a fiber optic cable in accordance with an embodiment of the present invention.

DETAILED DESCRIPTION OF THE INVENTIONS

Figure 9:
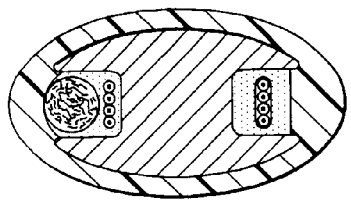
FIG. 9 is a cross-sectional view of a fiber optic cable in accordance with an embodiment of the present invention.

A fiber optic cable 10 according to an embodiment of the present invention is depicted in FIGS. 1 and 2. Fiber optic cable 10 includes at least one optical fiber component 11 disposed within a retention area 13 of a support member 12. Retention area 13 preferably has a generally helical lay of specified length 'L'. A cable jacket 17 substantially surrounds optical fiber component 11 and support member 12. A cushioning zone 18 can be disposed adjacent to the optical fiber component, and a water-blocking component 19 can be enclosed by the cable jacket 17.

Optical fiber component 11 preferably comprises at least one loose optical fiber. However, component 11 can be tight buffered optical fibers, bundled or ribbonized optical fibers in a common matrix, a stack of optical fiber ribbons in a common matrix or any combination thereof. Each optical fiber preferably includes a silica-based core that is operative to transmit light and is surrounded by a silica-based cladding having a lower index of refraction than the core. A soft primary coating surrounds the cladding, and a relatively rigid secondary coating surrounds the primary coating. Each optical fiber can be, for example, a single-mode or multi-mode optical fiber available commercially from Corning Inc.

The preferred embodiment does not require cushioning zone 18. However, cushioning zone 18 can be disposed adjacent to optical fiber component 11 for preferably preserving optical performance. Cushioning zone 18 is preferably operable to decouple optical fiber component 11 from support member 12. If employed, cushioning zone 18 preferably is generally interposed between support member 12 and optical fiber component 11, and it advantageously decouples optical fiber component 11 from support member 12. Most preferably, cushioning zone 18 substantially surrounds optical fiber component 11. If employed, preferred cushioning zone 18 includes soft thermoplastic elastomers, but can include materials such as aramid fibers, greases, gels, foams, water-blocking compounds such as tapes, yarns and/or powders or any other suitable materials.

The preferred embodiment includes an interfacial layer 15 disposed between the outer surface 16 of the support member 12 and cable jacket 17, more specifically, layer 15 provides corrosion resistance. Interfacial layer 15 most preferably includes a corrosion protection material on the surface of retention area 13, most preferably, a thermoplastic layer. Interfacial layer 15 can include a water-swellable material, a material to promote adhesion between the support member 12 and cable jacket 17 such as ethylene acrylic acetate, a primer, plastic, tape, zinc, copper, other corrosion protective materials, and/or a surface roughness for adhesion purposes.

In addition, the preferred embodiment includes at least one water-blocking component 19 disposed adjacent an outer surface of support member 16, most preferably, counter-helically wound around support member 12, but can be disposed either longitudinally or helically. Water-blocking component 19 preferably crosses retention area 13 at least once per helical cycle of the retention area. Water-blocking component 19 can also function to retain optical fiber component 11 within retention area 13.

Figure 10:
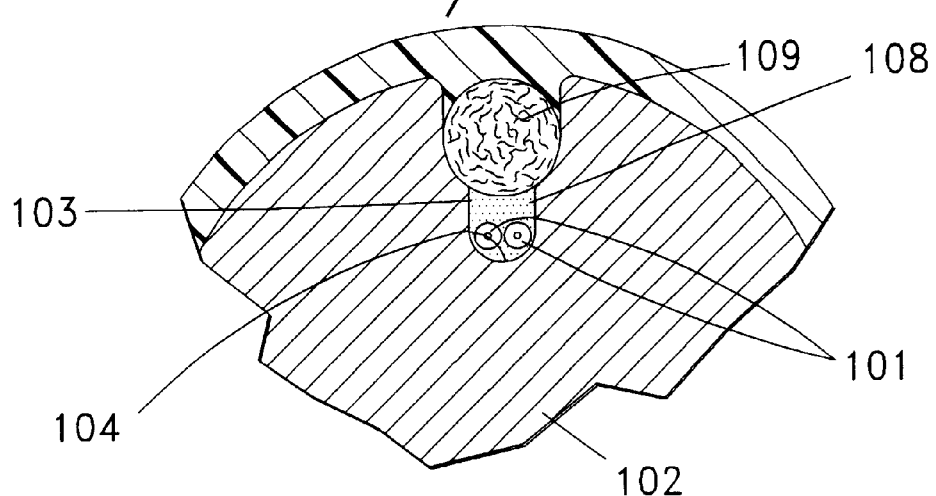
FIG. 10 is a cross-sectional view of a fiber optic cable in accordance an embodiment of the present invention.
Figure 11:
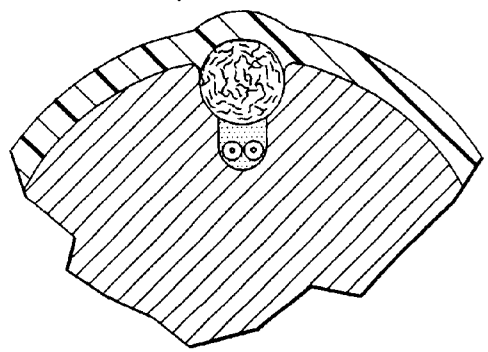
FIG. 11 is a cross-sectional view of a fiber optic cable in accordance with an embodiment of the present invention.

Alternatively, water-blocking component 19 can be disposed in other locations, for example, in a groove 19a of support member 12. Groove 19a, most preferably, is disposed counter-helically with respect to retention area 13 for securing optical fiber component 11 in retention area 13, but can be disposed longitudinal to the cable axis or helically with respect to retention area 13. Preferably groove 19a crosses retention area 13 once per helical cycle. Groove 19a can be various shapes, depths and widths, preferably groove 19a is selected so that water-blocking component 19 does not contact optical fiber component 11. However, water-blocking component 19 can be disposed within retention area 13 (FIGS. 5–8). Retention area 13 and groove 19a can have the same helical cycle with the depths and widths selected to avoid and/or reduce contact between optical fiber component 11 and water-blocking component 19 (FIGS. 10–11).

Water-blocking component 19 generally includes water-swellable particles that swell upon exposure to water so as to form a blockage in the cable that inhibits further migration. Generally, the water-swellable particles are formed of a superabsorbent polymer on a medium, for example, a yarn or tape, but can be in powder form. Preferred superabsorbent polymers are partially cross-linked polymers that absorb many times their own weight in water and swell considerably without dissolving, for example, acrylate, urethane or cellulosic-based superabsorbent materials. Water-blocking component 19 can also serve other functions, for example, the water-blocking component can also function as a ripcord for convenient fiber access. Component 19 can also function as indicia of fiber location by slightly protruding from the profile of the cable jacket (FIG. 11).

Cable jacket 17 generally provides environmental protection and generally surrounds optical fiber component 11 and support member 12. Cable jacket 17 can also be in communication with retention area 13. Cable jacket 17 is preferably formed of polyethylene or flame-retardant plastics, such as PVC or flame retardant polyethylene. A tube-on or pressure extrusion process can be used to apply cable jacket 17, which generally has a thickness of about one millimeter. The shape of cable jacket 17 generally conforms to the shape of support member 12, but can be used to fill areas or alter the cross-sectional shape. Furthermore, crush resistance can be incorporated by pressure extruding cable jacket 17 into interstices of retention area 13 (FIG. 8).

Support member 12 is most preferably formed of steel, but it can be manufactured from any suitable dielectric or metallic material. Such materials include, for example, aluminum, copper, composite metals, plastics, or glass-reinforced plastics. In preferred embodiments, cables according to the present invention are mechanically robust, for example, support member 12 preferably can withstand a predetermined tensile load, up to about 1000 lbs. or more. Additionally, cable 10 preferably has a minimum bend radius of about ten centimeters or less and a maximum span of preferably about two-hundred feet or more. Moreover, at the predetermined tensile load support member 12 and/or cable 10 should have a strain in the range of essentially about 0% to about 1.0%, more preferably between essentially about 0% and about 0.3% and most preferably between essentially about 0% and about 0.1%. Additionally, cable 10 can have an excess fiber length to generally accommodate the range of strains. Excess fiber length can be accomplished, for example, by placing the optical fiber component into a stressed support member during the manufacturing process.

In the preferred embodiment, retention area 13 comprises an optical component receiving area, which has a helical lay length about equal to the minimum bend radius. Preferably, retention area 13 is a groove that can be various shapes, for example, arcuate, U or V grooves or square. Retention area 13 is disposed generally helically with a constant pitch relative to the cable axis, but can be periodically-reversing pitch or variable pitch. Preferably, retention area 13 is not disposed longitudinally in a fixed position relative to the longitudinal axis of the cable.

Moreover, retention area 13 does not include sharp corners and/or edges, but can include a coating, for example, a thermoplastic layer, forming a smooth surface. The layer on retention area 13 can be the same or a different material than the material on the remaining outer surface of support member 12. Moreover, an embodiment can include a retention area 13 having an air gap between optical fiber component 11 and the retention area coating. The shape of retention area 13 can include a radius on corners and/or edges for avoiding stress concentrations in support member 12. In the preferred embodiment, the corners and edges of retention area 13 have a radius of about zero to about 0.12 millimeters. Most preferably, the corners and edges of the retention area 13 have a radius of about 0.05 millimeters.

In the preferred embodiment, retention area 13 is sized to receive optical fiber component 11 and optionally water-blocking component 19. As illustrated in FIG. 2, a width 'W' of the preferred embodiment is about 0.75 millimeters, but can be generally selected based upon the components within retention area 13 and considerations as crush ratings, temperature range, strain and/or stress loads.

Retention area 13 also includes a depth 'D', preferrably about 1.3 millimeters, which is greater than a radius of support member 12 as illustrated in FIG. 2. In an aspect of the present invention, 'D' can be selected so that optical fiber component 11 will be located at about, or as close as possible, to a neutral bending axis of the cable that is generally perpendicular to 'D' for avoiding undue stress on the optical fiber component during cable bending. Depth 'D' of retention area 13 can be selected based upon components disposed in retention area 13. In addition, depth 'D' is preferably selected based on such considerations as crush ratings, temperature range, strain and/or stress loads. In other words, in the preferred embodiment, optical fiber component 11 is located generally on a transverse plane, generally perpendicular to depth 'D', that preferably experiences about zero stress when the fiber optic cable is stressed in the 'D' direction. If cushioning zone 18 is employed, 'D', most preferably, is predetermined with a dimension that positions optical fiber component 11 at, or as close as possible, to the neutral bending axis thereby allowing cushioning zone 18 space between a bottom surface 14 of retention area 13 and optical fiber component 11. Furthermore, as illustrated in FIG. 2a, a support member 12a can include at least one recess 12b, which controls the location of the neutral axis of support member 12a. The support member geometry can be varied for placing optical fiber component 11 at or about the neutral axis or manipulating a preferential bend of cable 10.

Additionally, cable jacket 17 can include a retention area marking indicia (not illustrated) to aid in locating the position of optical fiber component 11. The preferred embodiment includes a cable jacket 17 marking indicia formed by a stripe, but can be a protrusion on the cable jacket 17, indentation, hot foil, dot, ink jet or laser printing or any other suitable indicia indicating the location of retention area 13. Indicia can also be an indentation as disclosed in U.S. Pat. No. 5,067,830, which is incorporated herein by reference. Fiber optic cable 10, preferably, has an outer diameter of about 2.2 millimeters, but can have a range of outer diameters or major transverse measurements. The range of outer diameters or major transverse measurements can be from about one millimeter to about ten millimeters or more. Additionally, fiber optic cable 10 can have different shapes, for example, circular, rectangular, square or elliptical.

Fiber optic cable 10 is advantageous because, for example, it is suitable for both aerial and buried cable environments, it is reliable and low cost. However, fiber optic cable 10 can take other forms while still providing these same advantages. As shown in FIG. 3, for example, fiber optic cable 30 is another embodiment of the present invention. As described in conjunction with the embodiments of FIG. 1, fiber optic cable 30 includes at least one and, more preferably, a plurality of retention areas 33 in a support member 32. Furthermore, retention areas 33 can be defined by various shapes, depths and helical lay lengths. Optical fiber components 31 can be disposed within each retention area 33. This embodiment includes an optical fiber ribbon and a cushioning zone 38 in each retention area. The embodiment in FIG. 3 can include an interfacial layer on an outer surface of support member 32, a cushioning zone, and/or a water-blocking components 39 as described herein.

Illustrated in FIG. 4 is fiber optic cable 40 of another embodiment of the present invention. As described in conjunction with the embodiments of FIG. 1, fiber optic cable 40 includes a retention area 43 in a support member 42. Retention area 43 is generally in the shape of a V and can be defined by various angles and depths. An optical fiber component 41 can be disposed within retention area 43. This embodiment includes a loose optical fiber with a cushioning zone 48 in retention area 43. The embodiment in FIG. 4 can include a plurality of retention areas, an interfacial layer on an outer surface of support member 42, a cushioning zone 48, and/or a water-blocking component as described herein.

Illustrated in FIG. 5 is fiber optic cable 50 of another embodiment of the present invention. As described in conjunction with the embodiments of FIG. 1, fiber optic cable 50 includes a retention area 53 in a support member 52. Retention area 53 is generally in the shape of a V with a radius at a bottom surface 54, preferably selected, to cradle an optical fiber component 51. Various angles and depths can define retention area 53. Optical fiber component 51 can be disposed within retention area 53. This embodiment includes a loose optical fiber with a cushioning zone 58 and a water-blocking component 59 in retention area 53. The embodiment in FIG. 5 can include a plurality of retention areas, an interfacial layer on an outer surface of support member 52, a cushioning zone 58, and/or a water-blocking component 59 as described herein.

Illustrated in FIG. 6 is fiber optic cable 60 of another embodiment of the present invention. As described in conjunction with the embodiments of FIG. 1, fiber optic cable 60 includes a retention area 63 in a support member 62. Retention area 63 is generally in the shape of a U with a radius at a bottom surface 64. Retention area 63 can be defined by various widths and depths. Optical fiber component 61 can be disposed within retention area 63. This embodiment includes a plurality of loose optical fibers with a cushioning zone 68 and a water-blocking component 69 in retention area 63. The embodiment in FIG. 6 can include a plurality of retention areas, an interfacial layer on an outer surface of support member 62, a cushioning zone 68, and/or a water-blocking component 69 as described herein.

Illustrated in FIG. 7 is fiber optic cable 70 of another embodiment of the present invention. As described in conjunction with the embodiments of FIG. 1, fiber optic cable 70 includes a retention area 73 in a support member 72. Retention area 73 is generally in the shape of a U with a radius at a bottom surface 74. Retention area 73 can be defined by various widths and depths. The optical fiber component 71 can be disposed within the retention area 73. This embodiment includes an optical fiber ribbon and a plurality of water-blocking components 79 in the retention area 73. The plurality of water-blocking components 79 are disposed adjacent the optical fiber component, more specifically, above and below the optical fiber component 79. The embodiment in FIG. 7 can include a plurality of retention areas, an interfacial layer on an outer surface of support member 72, a cushioning zone 78, and/or a water-blocking component 79 as described herein.

Illustrated in FIG. 8 is fiber optic cable 80 of another embodiment of the present invention. As described in conjunction with the embodiments of FIG. 1, fiber optic cable 80 includes a retention area 83 in a support member 82. Retention area 83 is generally in the shape of a U with a substantially flat bottom surface 84. Retention area 83 can be defined by various widths and depths. Optical fiber component 81 can be disposed within the retention area 83. This embodiment includes a plurality of loose optical fibers with a cushioning zone 88 and a water-blocking component 89 with a non-circular cross-section disposed within retention area 83. This embodiment includes a cable jacket 87 formed by a pressure fitted extrusion process. The pressure fitted extrusion process fills at least one interstices 83*a* in retention area 83. Filling the interstices 83*a* with the cable jacket material provides improved crush resistance/protection to fiber optic cable 80. The embodiment in FIG. 8 can include a plurality of retention areas, an interfacial layer on an outer surface of support member 82, a cushioning zone 88, and/or a water-blocking component 89 as described herein.

As illustrated in FIG. 9 the fiber optic cable of the present invention is depicted with non-circular cross-sections. Additionally, the fiber optic cable of the present invention can have square, rectangular, elliptical or arcuate cross-sections. Non-circular cross-sections can include a plurality of retention areas, an interfacial layer on the outer surface of support member, a cushioning zone, and/or a water-blocking component as described herein.

Illustrated in FIG. 10 is fiber optic cable 100 of another embodiment of the present invention. As described in conjunction with the embodiments of FIG. 1, fiber optic cable 100 includes a retention area 103 in a support member 102. The retention area 103 generally includes two distinct areas, more specifically, two stacked generally U-shaped areas with a radius at a bottom surface 104. Both generally U-shaped areas can be defined by various widths and depths. Optical fiber component 101 can be disposed within the first generally U-shape of retention area 103, as illustrated, this embodiment includes loose optical fibers within a cushioning zone 108. Disposed in the second generally U-shaped area of retention area 103 is a water-blocking component 109. FIG. 11 illustrates a similar configuration, however, the depth of the second generally U-shaped area is selected so that a protrusion is formed above a uniform cross-section of the cable to function as an indicia to locate the retention area. The embodiments in FIGS. 10 and 11 can include a plurality of retention areas, an interfacial layer on an outer surface of support member, a cushioning zone, and/or a water-blocking component as described herein.

Figure 12:
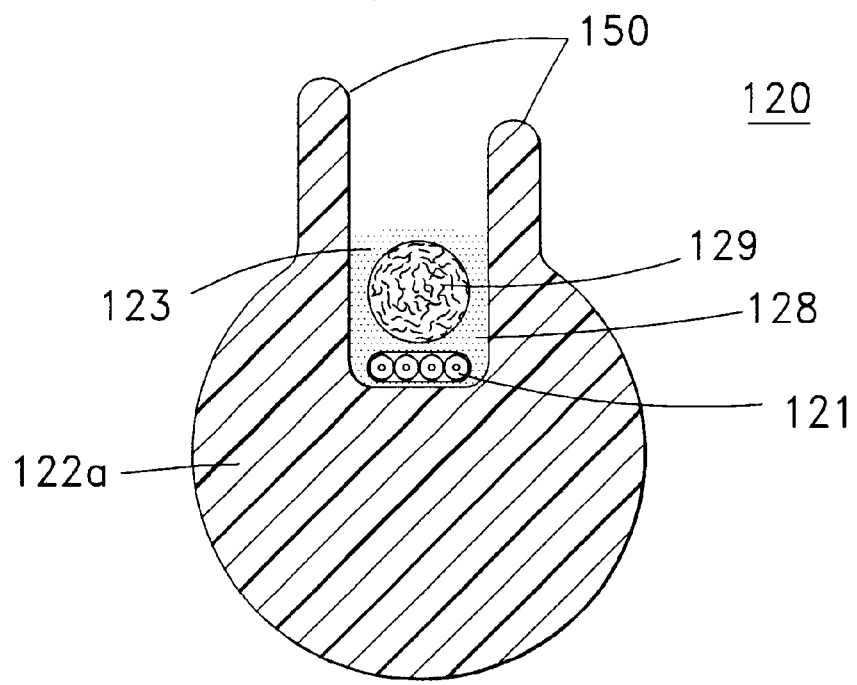
FIG. 12 is a cross-sectional view of a fiber optic cable in accordance with an embodiment of the present invention.
Figure 13:
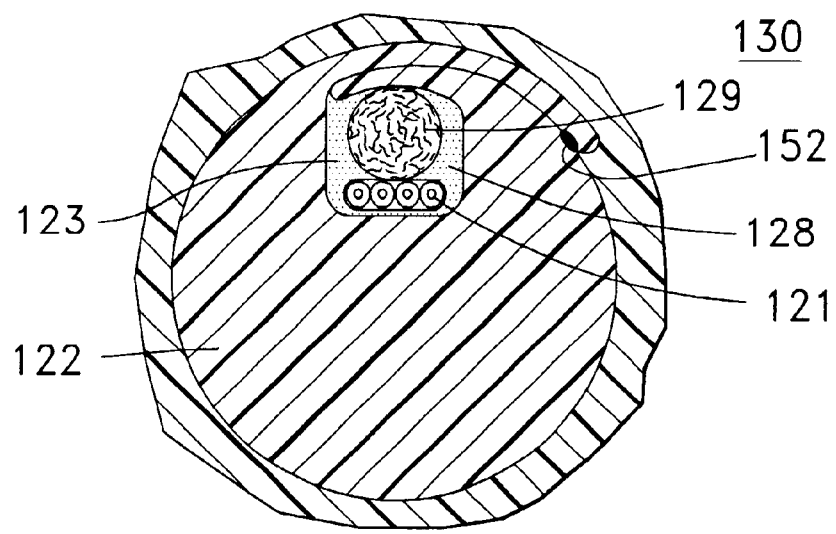
FIG. 13 is a cross-sectional view of a fiber optic cable embodiment, as illustrated in FIG. 12, after at least one manufacturing step.

FIGS. 12 and 13 illustrate another embodiment of the present invention. As described in conjunction with the embodiments of FIG. 1, fiber optic cable 120 includes a retention area 123 in a support member 122. The support member 122 most preferably is made of a deformable metal, e.g. steel, but can be a dielectric or metallic material. Support member 122 includes a body 122*a* and at least one bendable tab 150 extending from the outer surface of the support member 122. Tab 150 is bendable relative to body 122*a*. Any embodiment of the present invention can include such a tab. The preferred embodiment includes two tabs of unequal length, but can include a single tab or two tabs of equal length. Preferably tabs 150 include a taper to prevent wrinkling after bending. After insertion of the optical fiber component 121, and any optional components, for example, a cushioning zone 128 and/or a water-blocking component 129, bendable tabs 150 can be folded to close the opening to retention area 123. FIG. 13 illustrates tabs 150 in the folded position. Tab 150, most preferably, forms a smooth surface at the interface with body 122*a* to promote cable jacket adhesion. A sealing means 152 can be disposed adjacent a seam between tab 150 and support member 122 for preventing environmental effects from reaching retention area 123. The sealing means 152 can include an adhesive, cold fusion, laser welding, silicone, soldering or any other suitable material or process to substantially fix the tab and/or seal the seam. The embodiments of FIGS. 12 and 13 can include a plurality of retention areas, an interfacial layer on an outer surface of support member 122, a cushioning zone 128, a water-blocking component 129 and/or a cable jacket as described herein.

Many modifications and other embodiments of the present invention will become apparent to skilled artisans. For example, a plurality of support members and/or cables can be stranded together or a buffer tube, which houses the optical fiber components with or without a cushioning zone, can be disposed within the retention area. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. The invention has been described with reference to drop cable designs but That which is claimed:

1. A fiber optic cable, comprising:
    a support member comprising a metallic material having at least one retention area generally helically formed therein relative to an axis of the cable, said at least one retention area having a depth greater than a radius of said support member;
    at least one optical fiber component disposed within said at least one retention area; and
    an interfacial layer at least partially disposed between an outer surface of said support member and a cable jacket generally surrounding said support member.

2. A fiber optic cable according to claim 1, said interfacial layer being at least partially disposed in said retention area and comprising a thermoplastic layer.

3. A fiber optic cable according to claim 1, further comprising at least one tab extending from said support member, said at least one tab being bendable for at least partially covering said retention area.

4. A fiber optic cable according to claim 1, said at least one optical fiber component being adjacent to a cushioning zone.

5. A fiber optic cable according to claim 4, said cushioning zone substantially surrounding the at least one optical fiber component.

6. A fiber optic cable according to claim 1, said retention area having a depth greater than a radius of said support member.

7. A fiber optic cable according to claim 1, said at least one retention area being generally V-shaped.

8. A fiber optic cable according to claim 1, said at least one retention area being generally U-shaped.

9. A fiber optic cable according to claim 1, said at least one retention area being generally U-shaped with a generally flat bottom portion.

10. A fiber optic cable according to claim 1, a cross-sectional area of the cable being generally non-circular.

11. A fiber optic cable according to claim 1, said cable jacket including an indicia.

12. A fiber optic cable according to claim 1, said at least one retention area including at least two generally distinct shaped areas.

13. A fiber optic cable according to claim 1, further comprising at least one water-blocking component disposed between an outer surface of said support member and said cable jacket.

14. A fiber optic cable, comprising:
    a support member formed of a metallic or dielectric material, said support member having at least one retention area disposed substantially helically about an axis of the cable;
    at least one optical fiber component disposed within said at least one retention area;
    a cushioning zone disposed in said at least one retention area and adjacent to said optical fiber component; and
    an interfacial layer for corrosion protection and at least one water-blocking component at least partially disposed between an outer surface of said support member and a cable jacket generally surrounding said support member.

15. A fiber optic cable according to claim 14, said interfacial layer comprising a thermoplastic layer.

16. A fiber optic cable according to claim 14, said cushioning zone substantially surrounds the optical fiber component for decoupling said optical fiber component from said support member.

17. A fiber optic cable according to claim 14, said at least one retention area being generally V-shaped.

18. A fiber optic cable according to claim 14, said at least one retention area being generally U-shaped.

19. A fiber optic cable according to claim 14, said at least one retention area being generally U-shaped with a generally flat bottom portion.

20. A fiber optic cable according to claim 14, a cross-sectional area of the cable being generally non-circular.

21. A fiber optic cable according to claim 14, the cable includes an indicia.

22. A fiber optic cable according to claim 21, said indicia comprising a protrusion above a generally uniform cross-section of said cable.

23. A fiber optic cable according to claim 14, said at least one retention area including at least two generally distinct shaped areas.

24. A fiber optic cable according to claim 14, said at least one retention area comprising an interstice, said cable jacket at least partially filling said interstice.

25. A fiber optic cable according to claim 14, further comprising at least one tab extending from said support member, said tab being bendable for at least partially covering said retention area.

26. A fiber optic cable according to claim 14, said retention area having a depth greater than a radius of said support member.

27. A fiber optic cable, comprising:
    a support member having at least one retention area generally helically formed therein relative to an axis of the cable, said at least one retention area having a depth greater than a radius of said support member;
    at least one optical fiber component disposed within said at least one retention area; and
    the cable having a strain of about a 1.0% or less when applying about a 1,000 lb. tensile force.

28. A fiber optic cable according to claim 27, said cable having a strain of about 0.3% or less when applying about a 500 lb. tensile force.

29. A fiber optic cable according to claim 27, said cable having a strain of about 0.3% or less when applying about a 300 lb. tensile force.

30. A fiber optic cable according to claim 27, further comprising at least one tab extending from said support member, said at least one tab being bendable for at least partially covering said at least one retention area.

31. A fiber optic cable according to claim 27, further comprising an interfacial layer at least partially disposed between an outer surface of said support member and a cable jacket generally surrounding said support member.

32. A fiber optic cable according to claim 31, said interfacial layer comprising a thermoplastic layer.

33. A fiber optic cable according to claim 31, said cable jacket comprising an indicia.

34. A fiber optic cable according to claim 27, said at least one optical fiber component being adjacent to a cushioning zone.

35. A fiber optic cable according to claim 34, said cushioning zone substantially surrounding said at least one optical fiber component.

36. A fiber optic cable according to claim 27, further comprising a water-blocking component disposed between an outer surface of said support member and said cable jacket.

37. A fiber optic cable according to claim 27, said retention area having a depth greater than a radius of said support member.

* * * * *